UNITED STATES PATENT OFFICE.

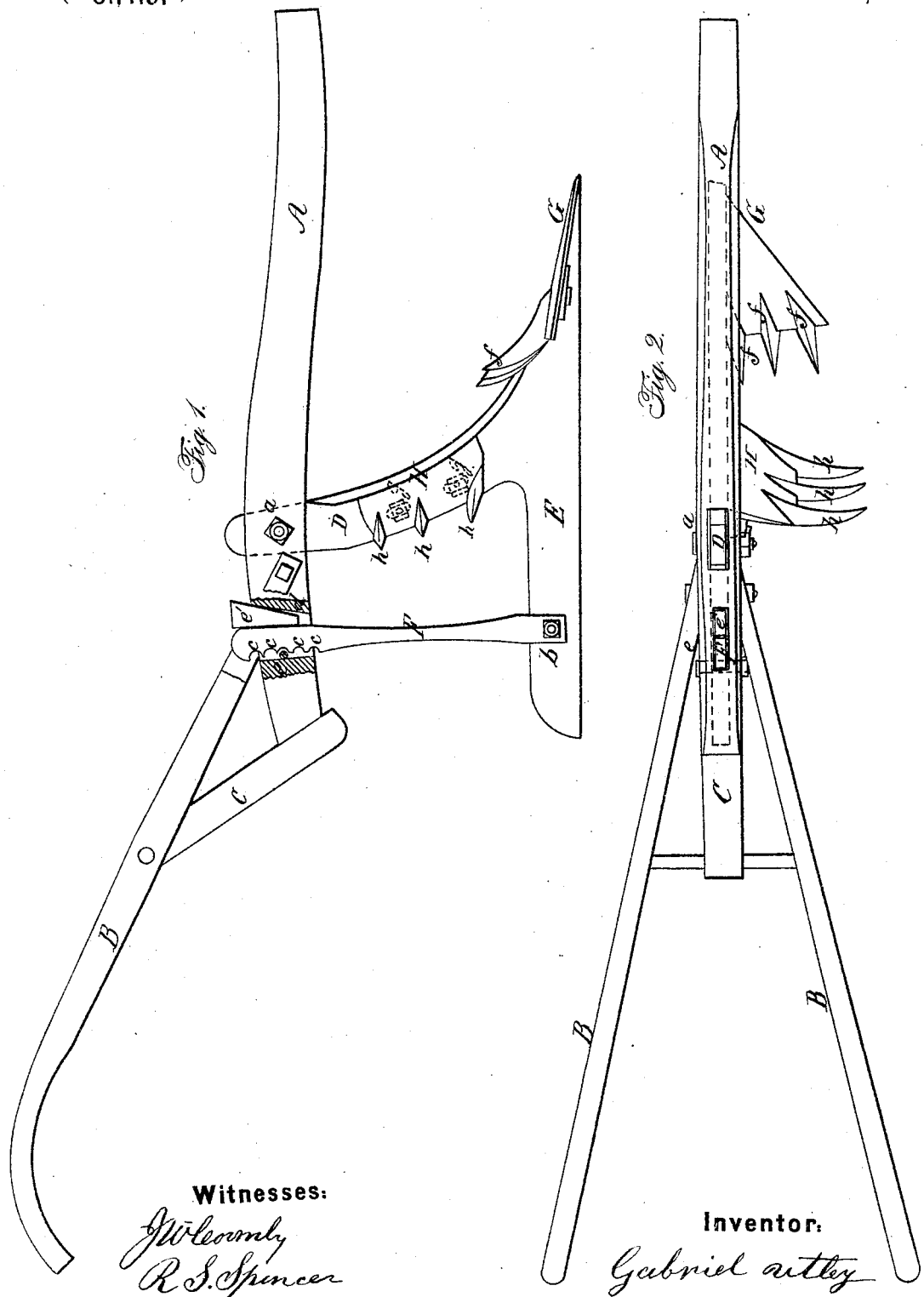

GABRIEL UTLEY, OF CHAPEL HILL, NORTH CAROLINA.

IMPROVEMENT IN PLOWS.

Specification forming part of Letters Patent No. 31,419, dated February 12, 1861.

*To all whom it may concern:*

Be it known that I, GABRIEL UTLEY, of Chapel Hill, in the county of Orange and State of North Carolina, have invented a new and Improved Plow; and I do hereby declare that the following is a full, clear, and exact description of the same, reference being had to the annexed drawings, making a part of this specification, in which—

Figure 1 is a side view of my invention, with a small part in section; Fig. 2, a plan or top view of the same.

Similar letters of reference indicate corresponding parts in the two figures.

To enable those skilled in the art to fully understand and construct my invention, I will proceed to describe it.

A represents the beam of the plow, B B the handles, and C the brace which supports them.

D represents a standard, the upper end of which is attached to the beam A by a bolt, $a$. E is the landside, which extends back considerably beyond the standard, and has an upright, F, attached to it by a bolt, $b$. The upper end of the upright F is notched at its back edge, as shown at $c$, and passes through a mortise, $d$, in the beam, either of the notches $c$ being kept on a transverse pin, $e$, in the beam by a wedge, $e'$, as shown clearly in Fig. 1. By this arrangement the point of the share may be elevated or depressed, so as to plow more or less deep, as may be desired.

To the front end of the landside E there is attached a share, G. This share has a series of teeth or cutters, $f$, at its back end. These are shown in the drawings, but more may be used, if desired. These teeth are curved upward, as shown clearly in Fig. 1, and form cutting-edges for the slice raised by the share G.

To the right side of the standard D there is secured by screw-bolts $g\,g$ a mold-board, H. This mold-board is provided with the usual point or share, and its outer edge has lateral teeth or cutters $h$. These are shown in the drawings, but more may be employed, if necessary. These cutters $h$ project out from the mold-board in nearly or about a horizontal position. As the plow is drawn along the teeth or cutters $f$ cut and pulverize the slice raised by the share G, and the subsoil is thereby rendered friable and prevented from packing. The teeth or cutters $h$ also pulverize the surface-soil, and the whole depth of soil from the surface to the bottom of the furrow made by the lower share, G, is pulverized and made light and friable and permeable to air and moisture, and the plow therefore rendered far more efficient than the ordinary subsoil-plows.

Having thus described my invention, what I claim as new, and desire to secure by Letters Patent, is—

The arrangement of the mold-board H, cutters $h$, lower share, G, and cutters $f$ with the landside E, standard D, adjustable upright F, and beam A, in the manner and for the purpose herein shown and described.

GABRIEL UTLEY.

Witnesses:
JAMES LAIRD,
LEWIS W. BENDRÉ.